United States Patent

[11] 3,579,238

[72] Inventors Andrew V. Haeff
Washington, D.C.;
Franklin H. Harris, Accokeek, Md.
[21] Appl. No. 649,104
[22] Filed Feb. 20, 1971
[45] Patented May 18, 1971
[73] Assignee The United States of America as represented by the Secretary of the Navy

[54] AUTOMATIC POWER CONTROL OF A PULSE MODULATOR
7 Claims, 6 Drawing Figs.

[52] U.S. Cl. .......... 343/18E, 343/7.5
[51] Int. Cl. .......... G01s 7/42, H04k 3/00
[50] Field of Search .......... 250/27 (T), 27, 27 (TR); 178/7.3 (DC); 250/17.553, .554, 6; 343/18 (E), 7.5; 250/27 (PD), 20.45

[56] References Cited

UNITED STATES PATENTS

| | | | |
|---|---|---|---|
| 2,219,449 | 10/1940 | Hofer et al. | 250/17.50X |
| 2,335,796 | 11/1943 | Schrader et al. | 250/17.50X |
| 1,904,142 | 4/1933 | Hyland | 250/17.556X |
| 2,228,119 | 1/1941 | Kinn | 250/17.556X |
| 2,335,278 | 11/1943 | Hilferty | 250/17.556 |
| 2,144,995 | 1/1939 | Pulvari-Pulveinacher... | 250/20.53 |
| 2,079,444 | 5/1937 | Flyer | 179/171 |

*Primary Examiner*—Malcolm F. Hubler
*Attorneys*—D. C. Snyder and G. H. White

ABSTRACT: In apparatus receiving periodic radiated pulses and transmitting other periodic radiated pulses responsively to said received pulses and in which the gain of the receiving means in said apparatus is subject to broad variation, means for controlling the output power of the transmitter in said system so that the transmitted pulses fed back through the receiving means do not exceed a selected amplitude, which comprises, a vacuum tube biased so as to be rendered conducting only by the received periodic pulses; a pulse generating means initiated into operation for one pulse only when said vacuum tube is rendered conducting; diode clipping means substantially removing the received periodic pulses from the output of the receiving means and leaving substantially only the portion of the transmitted signal which is fed back through the receiving means; means rectifying the output of the clipping means to form a bias voltage; a variable gain amplifier receiving the output from the pulse generating means, means applying said bias voltage to said variable gain amplifier so as to decrease the gain thereof when the average amplitude of the output of the clipping means increases; rectifier means connected so as to produce a negative direct current potential from an alternating current input; capacitor means coupling the output of the amplifier to the latter rectifier means; a power supply providing a positive and a negative source of potential; a normally conducting cathode loaded vacuum tube having a grid connected across the power supply, the cathode load of said vacuum tube comprising two serially connected resistors, the latter rectifier means being connected so as to operate with reference to the potential of the junction of the two cathode resistors and so that its output is applied to the grid of the cathode loaded vacuum tube; and a vacuum tube having a grid connected in shunt across the power input to the transmitter, the grid of the shunting vacuum tube being connected to the junction of the two cathode resistors.

Inventors
ANDREW V. HAEFF
FRANKLIN H. HARRIS

By M. O. Hayes
Attorney

Inventors
ANDREW V. HAEFF
FRANKLIN H. HARRIS
By M. O. Hayes
Attorney

Patented May 18, 1971

3,579,238

3 Sheets-Sheet 3

Inventors
ANDREW V. HAEFF
FRANKLIN H. HARRIS

By M. O. Hayes
Attorney

AUTOMATIC POWER CONTROL OF A PULSE MODULATOR

This invention relates in general to circuits for controlling the output of radio frequency transmitters and in particular to circuits for controlling the output of pulsed interference transmitters.

One of the more important military applications of radar is its use for the control of gun fire. Fire control radar is designed to reveal the range and bearing of a target object with greater accuracy than is normally possible with radar equipments designed for detection purposes only.

Efforts to impair the effectiveness of enemy fire control radar usually consist of transmitting an interfering signal which will either saturate one or more of the enemy receiver stages or render the visual presentation unintelligible. A signal particularly effective for the latter purpose is one comprising the random interplay of a broad spectrum of frequencies, commonly called a noise signal.

The interfering signal must be tuned to or approximately to the carrier frequency of the enemy radar. To be effective, the interfering signal must be many decibels larger than the echo signal at the enemy radar receiver. The interfering transmitter should be capable of being modulated with a signal containing relatively high frequencies. These three requisites create the need for an interfering transmitter, tunable over a broad range, capable of modulation up to several megacycles, and capable of delivering a large amount of power spread over a broad frequency spectrum. If the interfering signal is to be continuous, the design of such a transmitter involves the use of special power tubes which are not readily available.

An alternative method is to transmit the interfering signal in suitably timed pulses. Such a method permits peak power output from tubes with low average power capacities. Its use is based on the premise that for the protection of individual targets from enemy fire control radar it is sufficient that the interfering signals be received by these equipments only in the immediate proximity of the echo signals.

The preferred embodiment of this invention is for use as an improvement on such a pulsed interference transmitting system. This interference transmitting system, which is described in detail in several copending applications to be referred to hereinafter, operates as follows: A receiver, which is an integral part of the system, receives the pulsed signals from the enemy radar and applies them to actuate timing circuits. The timing circuits introduce a suitable delay after which they cause the interference transmitter to be actuated for a period sufficient to include the echo signal returned from the next succeeding radar pulse. The receiver and the transmitter are equipped with separate shielded antennas.

The monitoring and control receiver contains special arrangements to neutralize most of the transmitted interfering signal which is received by it through radiation leakage. The timing circuits are responsive only to received pulses exceeding a threshold amplitude.

Experience has indicated that it is possible to circumvent the impairment intended by the system as described above by varying the output amplitude of the victim radar. When the radar input to the monitoring and control receiver is varied, the input signals to the timing circuits fall successively above and below the threshold amplitude and satisfactory operation of these circuits is prevented. To minimize this difficulty, a special automatic gain control feature is incorporated in the receiver which varies the receiver gain over many decibels to hold its output pulses substantially constant.

The circumstance that the receiver gain is subject to variation of many decibels in operation requires that the transmitter output be subject to a corresponding control in order that the interfering signal fed back into the receiver through radiation leakage can be neutralized in the receiver.

An object of this invention is to provide a means for controlling the power output from a modulated radio frequency transmitter.

Another object of this invention is to provide a control signal, which control signal is effective only when a received signal both contains recurrent peak amplitudes exceeding a critical value and has an average amplitude less than another critical value.

A third object of this invention is to provide a means for controlling the power output of a radio frequency transmitter so that signals sent by the transmitter in response to signals received from a radar system will have an amplitude when received at the radar system approximately proportional to echo signals received through the same angle of the radar antenna pattern.

Other objects and features of this invention will become apparent from a consideration of the following description and the accompanying drawings.

Figure 1:
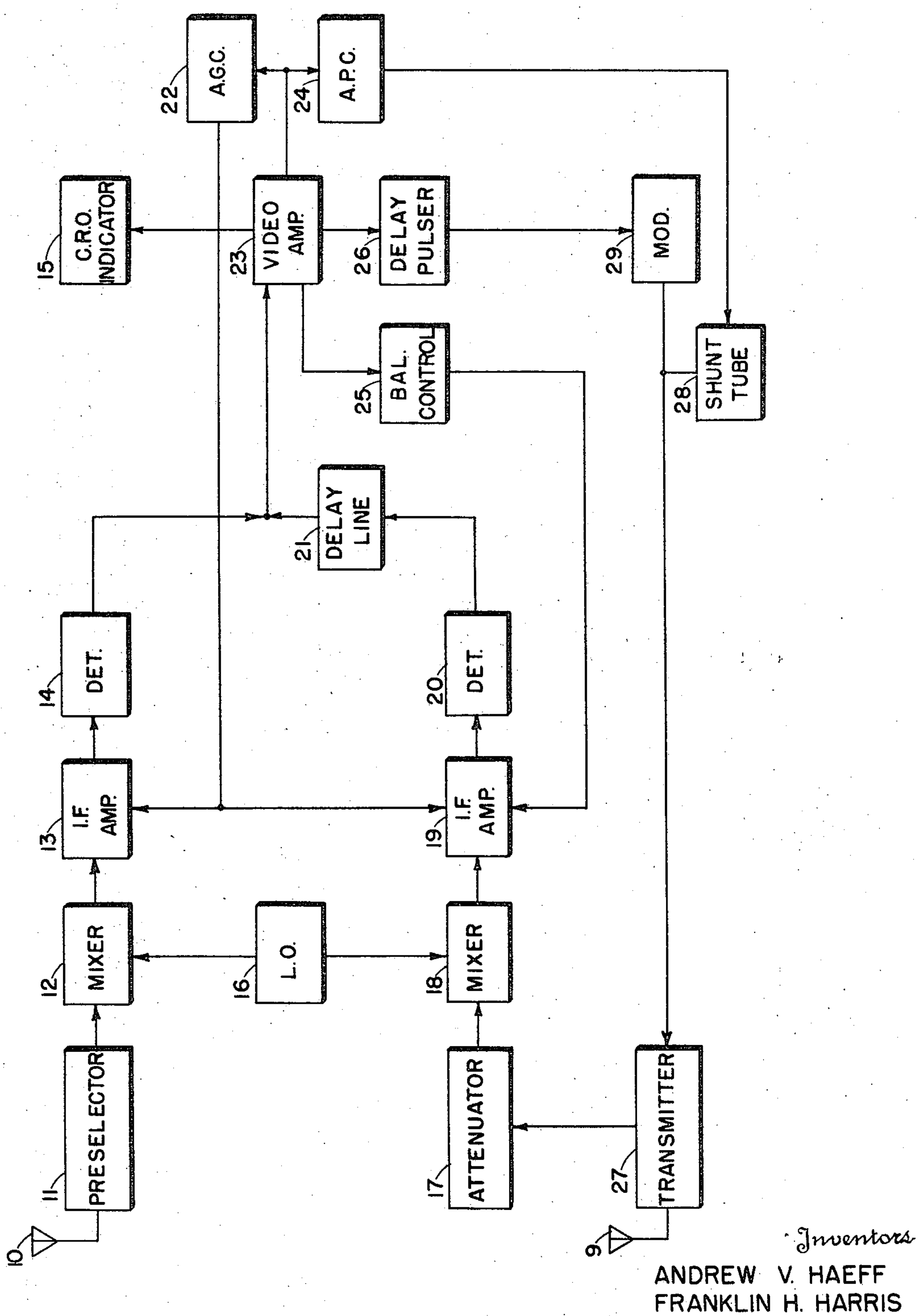
FIG. 1 is a block diagram of the pulsed interference transmitting system of which the preferred embodiment of the invention is a part.

In accordance with FIG. 1, in the pulsed interference transmission system with which the present invention is used, the basic circuits of which system are described in greater detail in the copending application of Andrew V. Haeff entitled: Pulse Generation System, Ser. No. 641,549, filed Jan. 16, 1946, the pulsed signals from the victim radar are received by antenna 10, and passed through preselector 11 to mixer 12 where they are converted to an intermediate frequency by beating with the output from local oscillator 16. The signals at the intermediate frequency are amplified in intermediate frequency amplifier section 13, demodulated in detector 14, further amplified in video amplifier 23, the output of which is applied to cathode ray oscilloscope indicator 15, automatic gain control circuits 22, automatic power control circuits 24, delay pulser timing circuits 26, and balance control 25.

The cathode ray oscilloscope indicator 15 is used both to analyze the enemy signal and to monitor the timing of the interfering signal.

The delay pulser circuits 26 are described in greater detail in the copending applications of Andrew V. Haeff and Franklin H. Harris, entitled: A Synchronizing System, Ser. No. 641,363, filed Jan. 15, 1946, and Pulse Transmission System, Ser. No. 641,548, filed Jan. 16, 1946, now U.S. Pat. No. 2,561,363. These circuits comprise two channels, one for timing an interference pulse to impair reception of the echo signals at the victim radar and the other for timing a false echo pulse which causes a false target to appear on the victim radar oscilloscope. In each of the two channels, received pulses exceeding a threshold amplitude actuate delay multivibrators which in turn actuate a pulse width multivibrator. In the interference channel, the delay multivibrators are arranged so that each received pulse causes an interfering pulse to be initiated which includes the echo from the next succeeding received pulse, and the pulse width multivibrator determines the duration of interfering pulse so that the victim radar is useless for fire control purposes. In the false echo channel the delay multivibrators are arranged so that the false echo will appear as a target in some position other than the position of the protected target, and the pulse width multivibrator establishes a duration similar to that of the victim radar pulses. The delay pulser circuits include means of automatically keeping the delay multivibrators adjusted to the pulse repetition rate of the victim radar and means of maintaining the system in operation through short interruptions in the reception of signals from the victim radar.

The modulator 29, which is described in greater detail in the copending application of Andrew V. Haeff and Franklin H. Harris entitled: Modulator, Ser. No. 647,414, filed Feb. 13, 1946, now U.S. Pat. No. 2,562,907, receives the control or timing pulses from delay pulser 26 and in response to these pulses applies high voltage noise modulated pulses to transmitter 27.

The output from transmitter 27 is radiated by antenna 9. Antennas 9 and 10 are shielded so as to minimize radiation coupling; nevertheless, some of the interfering and false echo signals emanating from antenna 9 are received by antenna 10. If these signals were not neutralized, they would render delay pulser 26 inoperative. Consequently, a neutralizing channel is provided in the receiver which is shown as attenuator 17, mixer 18, intermediate frequency amplifier 19, detector 20 and delay line 21.

A portion of the transmitter output is coupled directly into attenuator 17 which is arranged to provide an output signal so that the interfering signals arriving at video amplifier 23 through both channels will have approximately equal amplitudes. From attenuator 17 the neutralizing signal is applied to mixer 18 where it is converted to an intermediate frequency by beating with the output from local oscillator 16. The neutralizing signal at the intermediate frequency is amplified in intermediate frequency amplifier 19 and demodulated in detector 20. Detector 20 is arranged to provide an output of polarity opposite to that of detector 14. Because the interfering signal fed back into the receiver through radiation leakage has a longer path than the neutralizing signal, delay line 21 is provided to make the signals through the two channels coincident as they are applied to the video amplifier. The output of the video amplifier is applied to balance control circuits 25, described in detail in the Haeff application supra, which control the gain of intermediate frequency amplifier 19 so as to keep the pulse components of the interfering and false echo signals substantially neutralized.

This system of neutralization is extremely effective with respect to the pulse components and the lower frequency components of the noise signal. The higher frequency components of the noise signal are greatly reduced; however, residues of these higher frequency components appear in the final output.

As has been mentioned previously, it has been found that the victim radar can frequently circumvent the impairment intended by the system as described in the preceding paragraphs by varying the strength of the signals to be received by the system so that they will fall successively above and below the threshold of the delay pulser circuit 26. To prevent this means of circumvention, special automatic gain control circuits 22, described in detail in the copending application of Franklin H. Harris entitled: Automatic Gain Control For Pulse Amplifiers, Ser. No. 634,878, now U.S. Pat. No. 2,570,233 filed Dec. 13, 1945, are incorporated in the system. These automatic gain control circuits hold the signal pulse output from the video amplifier substantially constant regardless of very large variations in the signal input to antenna 10 by varying the gain of intermediate frequency amplifier 13 over a range of many decibels.

The control signal from automatic gain control circuits 22 is used to control the gain of intermediate frequency amplifier 19 in the neutralizing channel also, in order that the interfering or false echo signals applied by both channels will continue to offset one another. However, the higher frequency components of the noise signal which are not completely offset and which thus appear in the receiver output will increase in amplitude as the gain of the receiver channels is increased. Thus when the input signal to antenna 10 from the victim radar decreases from its normal amplitude to a very small amplitude, the high frequency components of the interfering signal which are not fully neutralized could increase to such an amplitude in the output of the video amplifier that the delay pulser circuits would be rendered inoperative from this source. To obviate this difficulty the automatic power control circuits 24 are also incorporated in the system.

The automatic power control circuits 24, in conjunction with shunt tube 28, hold the transmitter output to a relatively low power level unless the victim radar signals are being received and the interfering signal fed through to the receiver output is low (i.e., the receiver gain is low). When these conditions prevail, the output of transmitter 27 is allowed to increase until the interfering signal fed through approaches a critical value.

This form of power control not only assists in keeping the system operative but also makes the false echo pulses as received by the victim radar more nearly approach the amplitude which would be expected for true echoes. If the transmitter power were allowed to remain constant, all effective signal pulses received from the victim radar, regardless of amplitude when received at the interference transmitting system, would cause false echo pulses of the same amplitude to be transmitted. When the system includes the present invention, the amplitude of the false echo pulses transmitted will tend to follow the amplitude of the signal pulses received from the victim radar and thus the variations in the amplitude of the former, as received by the victim radar, will approach the expected variations in true echo signals.

Figure 2:
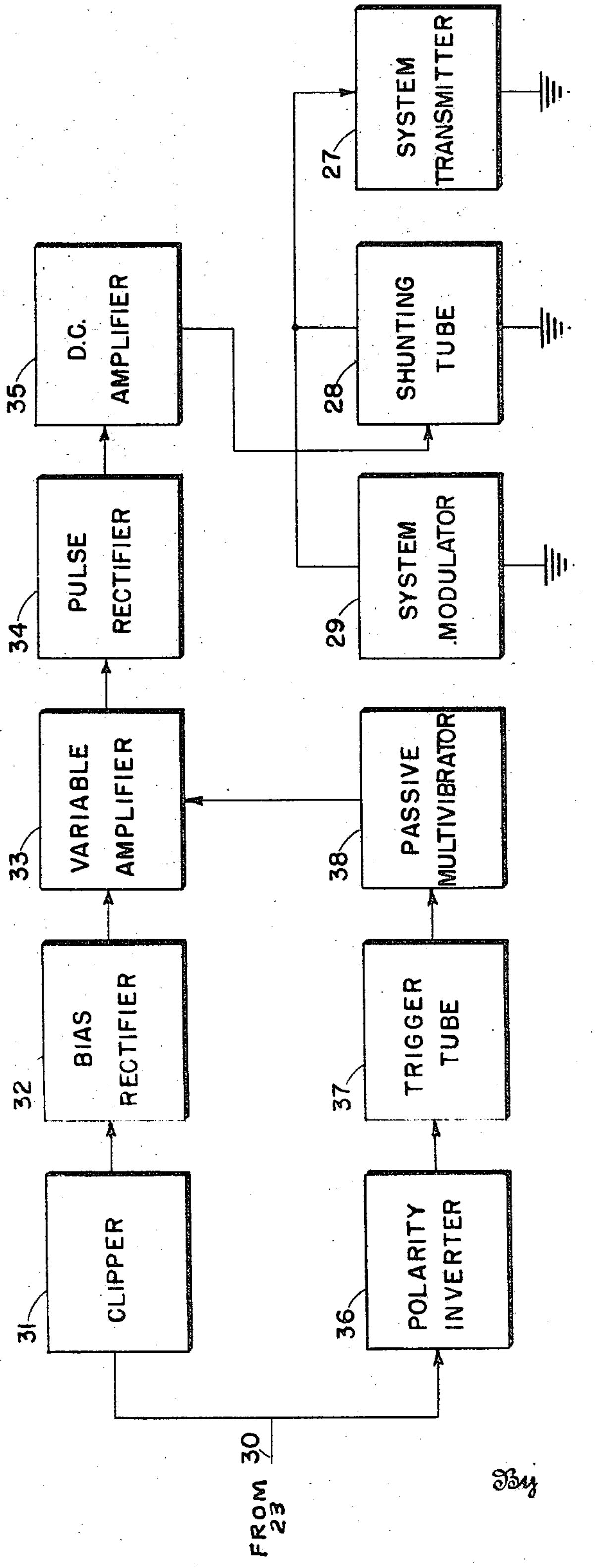
FIG. 2 is a block diagram of the pertinent circuits of this invention.
Figure 2A:
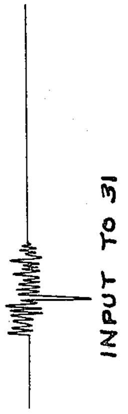
Figure 2B:
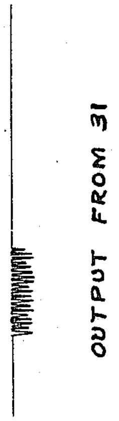

For a description of the operation of the invention, reference is made to FIG. 2. The output of the video amplifier comprises essentially a series of pulses of residual noise, each of said pulses containing a negative radar signal pulse as shown in FIG. 2A, is applied to clipper 31. Clipper 31 removes the positive excursions of this signal and removes the negative excursions exceeding a selected amplitude, so that the output of clipper 31 comprises substantially the negative portion of the interfering signal only, as shown in FIG. 2B.

The output from clipper 31 is rectified in bias rectifier 32 to form a negative direct current voltage the magnitude of which is proportional to the amplitude level of that part of the interfering signal which is not neutralized and thus appears in the output of the video amplifier. This negative direct current voltage is applied as bias to the variable amplifier 33. Thus the gain of variable amplifier 33 is decreased from its quiescent value (corresponding to zero bias) to zero (corresponding to cut off bias) as the interfering signal passing through the receiver increases.

The output from the video amplifier is also applied from terminal 30 to polarity inverter 36, which operates to invert the signal, and from polarity inverter 36 to trigger tube 37. Trigger tube 37 responds only to the positive pulsed signals corresponding to the signals received from the victim radar, and only when these signals are above the threshold amplitude. This tube actuates one shot or passive multivibrator 38 from which positive pulses are applied as the input signal to variable amplifier 33.

Accordingly, when signals are received from the victim radar which are above the minimum amplitude for effective operation of the automatic gain control circuits mentioned above, trigger tube 37 is actuated by corresponding signals, and multivibrator 38 applies a series of pulses as the input signal to variable amplifier 33. The output of variable amplifier 33 is a pulsed signal the amplitude of which decreases as the amplitude of the interfering signal passed through the receiver circuits increases. This pulsed signal is rectified in pulse rectifier 34 to form a direct current voltage which is amplified in direct current amplifier 35. The output of direct current amplifier 35 is a negative direct current voltage, proportional in magnitude to the amplitude of the pulsed signal output from variable amplifier 33. This negative direct current voltage is applied as bias to shunting tube 28.

Shunting tube 28 is connected across the output of the system modulator 29. In the quiescent condition, it has a zero bias and bypasses a substantial part of the modulator output and reduces the transmitter output accordingly.

When the system is in operation, the receiver gain is inversely proportional to the strength of the signals received from the victim radar, and the automatic power control circuits described above operate to reduce the transmitter output when the receiver gain is high. When the signal from the victim radar increases in amplitude; the receiver gain decreases; the interfering signal fed through the receiver decreases; the gain of variable amplifier 33 increases; the negative bias on shunting tube 28 increases; and accordingly a larger transmitter output is permitted.

When the signal from the victim radar diminishes in amplitude until it falls below the threshold of the system, the receiver gain is left high. It is, therefore, necessary that the transmitter output be restricted to a minimum when the received signals rise above threshold level after a momentary interruption in order that the interfering signal fed through the high gain receiver will not prevent the timing circuits from operating. This necessity is accomplished by having the negative bias on the shunting tube 28 depend on the presence of victim radar signals in the receiver output as well as a less than critical amount of interfering signal.

Figure 3:
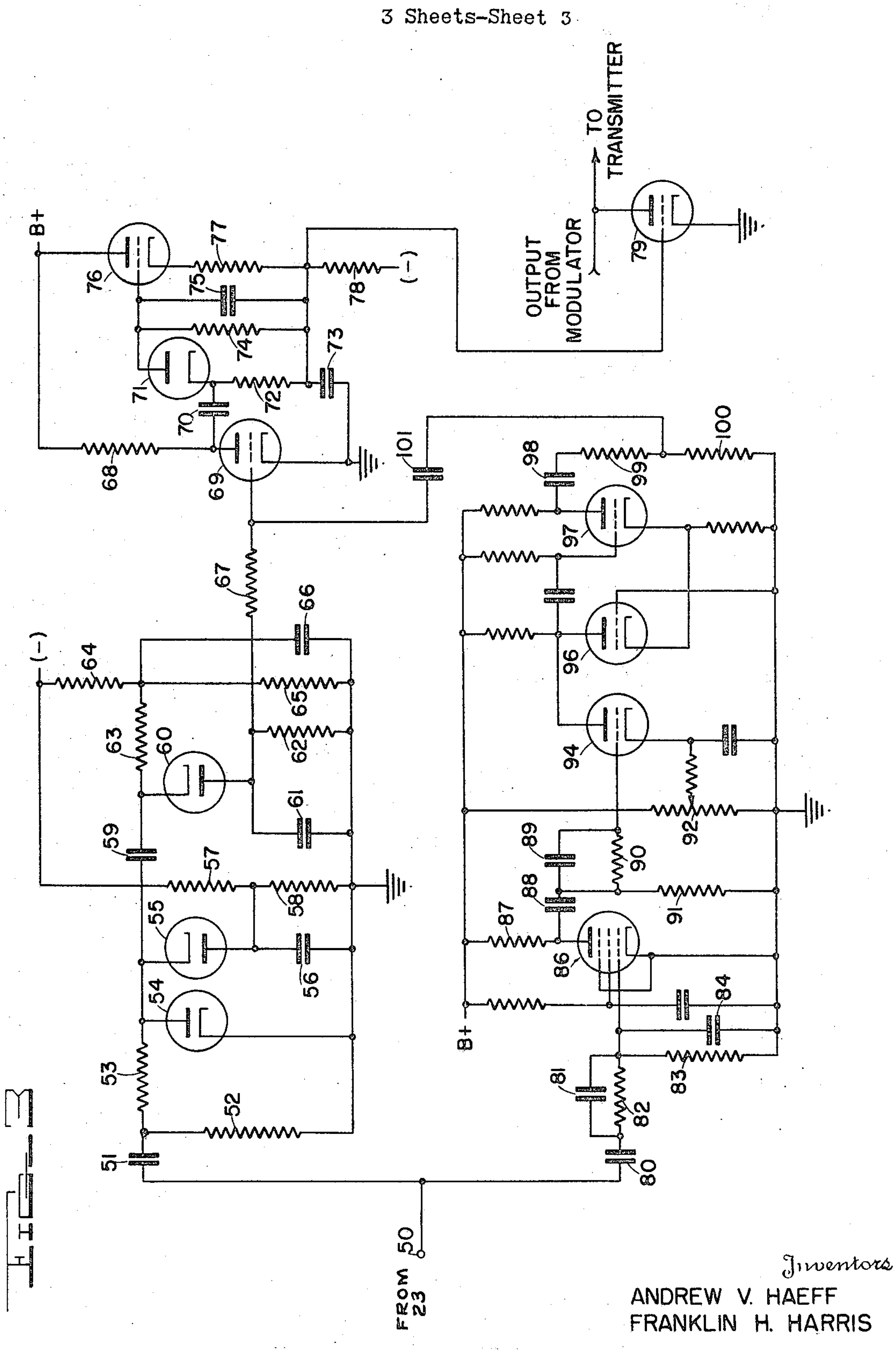
FIG. 3 is a schematic diagram of the pertinent circuits of this invention.

For a detailed description of the circuits used in the preferred embodiment of this invention, reference is made to FIG. 3.

From input terminal 50, the output of the video amplifier is passed through the coupling circuit comprising capacitor 51 and resistor 52 and through clipping resistor 53 to the plate of diode 54 and the cathode of diode 55. The cathode of diode 54 is connected to ground; consequently, this diode operates to eliminate positive excursions of the signal. The plate of diode 55 is connected to a negative potential established by the voltage divider comprising resistors 57 and 58 and by capacitor 56. This diode eliminates the negative excursions of the signal which exceed the potential established by the voltage divider. The latter potential is selected so that the effect of the signal from the victim radar is substantially eliminated but the negative part of the interfering signal is allowed to pass.

The output from the clipper is applied through capacitor 59 to the cathode of rectifier diode 60. The network comprising capacitor 61 and resistor 62 filter the output of diode 60, which output is applied as fixed bias to the control grid of variable amplifier tube 69 through isolating resistor 67. In the quiescent condition, this bias is maintained at a small negative value which is obtained from the voltage divider comprising resistors 64 and 65 and capacitor 66 and applied through resistor 63 to the cathode of diode 60.

The input signal is also applied from terminal 50 through capacitor 80 and through the frequency compensated attenuator comprising resistors 82 and 83 and capacitors 81 and 84 to the control grid of polarity inverter tube 86. The output of polarity inverter tube 86, which is obtained across plate load resistor 87, is applied through the coupling network comprising capacitor 88 and resistor 91 and through the isolating impedance comprising capacitor 89 and resistor 90, to the control grid of trigger tube 94. The isolating impedance is to prevent the grid circuit of the trigger tube from loading the output of the polarity inverter tube.

The cathode of trigger tube 94 is maintained at a positive potential determined by the position of the tap on potentiometer 92. This potential holds tube 94 cut off in the absence of a positive signal on its grid which exceeds a threshold amplitude. The tap on potentiometer 92 is placed so that tube 94 will be rendered conducting by signals from the victim radar but not by the interfering signal. Trigger tube 94 has a common load resistor with the normally off tube 96 of a one shot multivibrator comprising triodes 96 and 97 and their associated circuits. Consequently, when trigger tube 94 is rendered conducting, the multivibrator is initiated into operation and a positive pulse is obtainable at the plate of the normally conducting tube 97.

The positive pulsed output from the multivibrator is coupled through capacitor 98 to a voltage divider comprising resistors 99 and 100. The attenuated pulses are applied from the voltage divider through capacitor 101 to the control grid of variable amplifier tube 69.

The output of variable amplifier tube 69, which is obtained across plate load resistor 68, is applied through capacitor 70 to the cathode of pulse rectifier diode 71. The output of pulse rectifier diode 71 is filtered in the network comprising resistor 74 and capacitor 75 and applied as a negative direct current signal to the control grid of direct current amplifier tube 76. The plate of direct current amplifier tube 76 is connected directly to a source of positive voltage, and the cathode of this tube is connected through resistors 77 and 78 to a corresponding source of negative voltage. The junction of resistors 77 and 78 is connected to ground through stabilizing capacitor 73, to the cathode of diode 71 through resistor 72, and to the positive side of the filter comprising resistor 74 and capacitor 75. Consequently, the rectifier diode and its associated filter are operated about the potential of the junction between resistors 77 and 78. Tube 76 does not act as a cathode follower, but amplifies the signal applied to its grid.

The junction between resistors 77 and 78 is also connected to the grid of shunting tube 79. The values of resistances 77 and 78 are such that when tube 76 is conducting in the quiescent condition, grid current holds the bias on tube 79 at zero and the tube is fully conducting. As a negative signal is applied to the grid of direct current amplifier tube 76, its plate impedance increases and the potential at the junction of resistors 77 and 78 becomes negative, increasing the plate resistance of shunting tube 79. With a sufficient negative signal on the grid of tube 76, tube 79 is cut off and the activating signal from the system modulator is applied to the system transmitter without reduction.

Although we have shown and described only a certain and specific embodiment of the invention, we are fully aware of the many modifications possible thereof. Therefore, this invention is not to be limited except insofar as is necessitated by the spirit of the prior art and the scope of the claims.

The invention described herein may be manufactured and used by or for the Government of the United States of America for governmental purposes without the payment of any royalties thereon or therefor.

We claim:

1. A means for generating a control signal according to the character of an input signal, said control signal being effective only when said input signal contains recurrent amplitude peaks exceeding a first critical value and has an average amplitude less than a second critical value, which comprises, means rectifying said input signal to form a bias voltage, means generating pulses responsively to the recurrent amplitude peaks in said input signal, an amplifier for the output from said pulse generating means, and means controlling the gain of said amplifier by said bias voltage.

2. A means for generating a control signal according to the character of an input signal, said control signal being effective only when said input signal contains recurrent amplitude peaks exceeding a first critical value and has an average amplitude less than a second critical value, which comprises, vacuum tube means dividing said input signal into a first signal containing substantially only said amplitude peaks and a second signal containing the residue of said input signal; means rectifying said second signal to form a bias voltage; means generating pulses responsively to said first signal; an amplifier for the output from said pulse generating means, and means controlling the gain of said amplifier by said bias voltage.

3. A means for generating a direct current control signal according to the character of an input signal, said control signal being effective only when said input signal contains recurrent amplitude peaks exceeding a first critical value and has an average amplitude less than a second critical value, which comprises; vacuum tube means dividing said input signal into a first signal containing substantially only said amplitude peaks and a second signal containing the residue of said input signal; means rectifying said second signal to form a bias voltage; means generating pulses responsively to said first signal; an amplifier for the output from said pulse generating means, means controlling the gain of said amplifier by said bias voltage; and means rectifying the output from said amplifier means to form the direct current control signal.

4. A means for generating a direct current control signal according to the character of an input signal, said control signal according to the character of an input signal, said control signal being effective only when said input signal contains recurrent amplitude peaks exceeding a first critical value and has an average amplitude less than a second critical value, which comprises, means rectifying said input signal to form a bias voltage; means generating pulses responsively to the recurrent amplitude peaks in said input signal; an amplifier for the output from said pulse generating means, means controlling the gain of said amplifier responsively to said bias voltage; and means rectifying the output from said amplifier means to form the direct current control signal.

5. A means for generating a direct current control signal according to the character of an input signal, said control signal being effective only when said input signal contains recurrent amplitude peaks exceeding a first critical value and has an average amplitude less than a second critical value, which comprises, a vacuum tube biased so as to be rendered conducting only by the recurrent amplitude peaks in the input signal; a pulse generating means initiated into operation for one pulse only when said vacuum tube is rendered conducting; diode clipping means removing the recurrent amplitude peaks from the input signal; means rectifying the residue of the input signal to form a bias voltage; an amplifier for the output from said pulse generating means, means controlling the gain of said amplifier by said bias voltage; and means rectifying the output from said amplifier to form the direct current control signal.

6. In apparatus receiving periodic radiated pulses and transmitting other periodic radiated pulses responsively to said received pulses and in which the gain of the receiving means in said apparatus is subject to broad variation, means for controlling the output power of the transmitter in said system so that the transmitted pulses fed back through the receiving means do not exceed a selected amplitude, which comprises, vacuum tube means dividing the output from said receiving means into a first signal containing only the initially received periodic pulses and a second signal containing substantially only the portion of the transmitted pulses which is fed back through the receiving means; means rectifying the second signal to form a bias voltage; means generating pulses responsively to the first signal; a variable gain amplifier receiving the output from the pulse generating means, means applying said bias voltage to said variable gain amplifier to control the gain thereof, means rectifying the output from the amplifier to form a control signal; transmitter power input means, and a vacuum tube having a plate connected in shunt across the power input means, the plate resistance of said vacuum tube being determined by said control signal.

7. In apparatus receiving periodic radiated pulses and transmitting other periodic radiated pulses responsively to said received pulses and in which the gain of the receiving means in said apparatus is subject to broad variation, means for controlling the output power of the transmitter in said system so that the transmitted pulses fed back through the receiving means do not exceed a selected amplitude, which comprises, a vacuum tube biased so as to be rendered conducting only by the received periodic pulses; a pulse generating means initiated into operation for one pulse only when said vacuum tube is rendered conducting; diode clipping means substantially removing the received periodic pulses from the output of the receiving means and leaving substantially only the portion of the transmitted signal which is fed back through the receiving means; means rectifying the output of the clipping means to form a bias voltage; a variable gain amplifier receiving the output from the pulse generating means, means applying said bias voltage to said variable gain amplifier so as to decrease the gain thereof, when the average amplitude of the output of the clipping means increases; rectifier means connected so as to produce a negative direct current potential from an alternating current input; capacitor means coupling the output of the amplifier to the latter rectifier means; a power supply providing a positive and a negative source of potential; a normally conducting cathode loaded vacuum tube having a grid connected across the power supply, the cathode load of said vacuum tube comprising two serially connected resistors, the latter rectifier means being connected so as to operate with reference to the potential of the junction of the two cathode resistors and so that its output is applied to the grid of the cathode loaded vacuum tube; and a vacuum tube having a grid connected in shunt across the power input to the transmitter, the grid of the shunting vacuum tube being connected to the junction of the two cathode resistors.